(12) United States Patent
Lin

(10) Patent No.: US 7,486,283 B1
(45) Date of Patent: Feb. 3, 2009

(54) METHOD AND APPARATUS FOR COMMUNICATING DIGITAL DATA FROM A COMPUTER SYSTEM TO A DISPLAY DEVICE

(75) Inventor: Walter C. Lin, San Jose, CA (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 0 days.

(21) Appl. No.: 09/442,868

(22) Filed: Nov. 18, 1999

(51) Int. Cl.
G09G 5/00 (2006.01)

(52) U.S. Cl. ................................ 345/204; 345/100
(58) Field of Classification Search .......... 345/204, 345/213, 214, 87, 3.1, 98, 99, 100; 348/460, 348/553, 558, 537, 569, 571, 572; 725/98, 725/118; 358/445; 341/155; 375/240.26
See application file for complete search history.

(56) References Cited

U.S. PATENT DOCUMENTS

| | | | |
|---|---|---|---|
| 5,497,187 A * | 3/1996 | Banker et al. ................ 348/6 |
| 5,940,137 A * | 8/1999 | Hulvey .......................... 348/549 |
| 5,995,705 A * | 11/1999 | Lang ............................. 386/46 |
| 6,061,053 A * | 5/2000 | Pang ............................. 345/204 |
| 6,108,042 A * | 8/2000 | Adams et al. ................. 348/460 |
| 6,131,813 A * | 10/2000 | Knighton et al. ............. 235/454 |
| 6,150,810 A * | 11/2000 | Roybal .......................... 324/224 |
| 6,181,330 B1 * | 1/2001 | Yui et al. ....................... 345/204 |

* cited by examiner

*Primary Examiner*—Abbas I Abdulselam
(74) *Attorney, Agent, or Firm*—DLA Piper LLP (US)

(57) ABSTRACT

Method and apparatus by which digital data is communicated from a computer system to a display device. An analog video signal received from a computer system includes a predetermined data pattern. The analog video signal is sampled to detect the predetermined data pattern. The digital data is then recovered from the detected predetermined data pattern. The predetermined data pattern may occur a predetermined time interval after a horizontal sync pulse or may occur outside of a blanking interval. The display device may respond to the predetermined data pattern by commencing a set-up process, such as, adjusting a sampling rate for sampling the analog video signal; adjusting a sampling phase; or adjusting an orientation of a display image for the display device. Adjusting an orientation may comprise adjusting a sampling start time relative to a horizontal or vertical sync pulse. The predetermined data pattern may be representative of a parameter of the analog video signal, such as, resolution or frequency. The predetermined data pattern may be representative of a beginning of a horizontal blanking interval relative to a horizontal sync pulse for the analog video signal or representative of a beginning of a vertical blanking interval relative to a vertical sync pulse for the analog video signal. The predetermined data pattern may be utilized for adjusting a horizontal or vertical orientation of a display image for the display device.

32 Claims, 11 Drawing Sheets

METHOD AND APPARATUS FOR COMMUNICATING DIGITAL DATA FROM A COMPUTER SYSTEM TO A DISPLAY DEVICE

BACKGROUND OF THE INVENTION

The present invention relates to the field of display controllers. More particularly, the present invention relates to set-up and synchronization of a display controller for receiving analog video signals from a host computer system and for converting the analog video signals into digital samples prior to provision to a display monitor. The present invention also relates to communication of information from the host computer system to the display controller.

A desk top personal computer system typically includes a video adapter card connected to a system bus for the computer system along with a central processing unit (CPU) and memory. Data representative of an image to be displayed is typically generated by an application program stored in the memory and executed by the CPU. The image data is typically provided to the video adapter card via the system bus. A cathode ray tube (CRT) display monitor is typically connected to the video adapter card for displaying the image. Accordingly, the video adapter card forms signals which are appropriate for driving the CRT display.

An image is formed on the CRT by directing an electron beam, which originates from behind the display area of the CRT, according to a repeating pattern of equally-spaced horizontal scan lines which cover the display area of the CRT. This pattern is known as a scanning raster. One complete pass over the display area is referred to as a frame. For driving the CRT display, the video adapter card generates red (R), green (G), and blue (B) component signals along with a horizontal sync (HSYNC) signal and a vertical sync (VSYNC) signal. The RGB signals provide color and intensity information for the raster, while the HSYNC signal provides timing information for decoding horizontal scan lines for the scanning raster. The VSYNC signal provides timing information for decoding vertical retrace periods for the raster which occur between frames. The vertical retrace periods are accompanied by a vertical blanking interval during which the RGB signals do not convey color information (e.g., they are held at their lowest intensity level), while horizontal retrace periods are accompanied by horizontal blanking intervals. A portion of the horizontal blanking interval prior to a pulse in the HSYNC signal is known as a front porch, while a portion of the horizontal blanking interval following a pulse in the HSYNC signal is known as a back porch. Phosphor coatings on the CRT convert the electron beam into red, green and blue visible light, thus, forming a color image on the CRT.

The RGB, HSYNC and VSYNC video signals are analog signals which are typically formed in accordance with one of a variety of standardized formats. These standardized formats include: Enhanced Graphics Adapter (EGA), Video Graphics Array (VGA), SuperVGA, Extended Graphics Array (XGA), and Color Graphics Adapter (CGA). Each standard specifies available display modes, color resolutions, spatial resolutions, character sets, available graphics functions and a variety of other display parameters.

The spatial resolution in the vertical direction for the analog video signals is related to the number of horizontal lines which occur between vertical retrace periods. The spatial resolution in the horizontal direction is related to a number of cycles of a clock signal which occur during each horizontal line. A clock signal (e.g., a pixel clock) is formed by the computer system and is utilized for forming the analog video signals. For each cycle of the clock signal, the RGB analog video signals include constituents, such as color and intensity information, for display. Accordingly, each such clock cycle represents the minimum size for a feature of an image which may be displayed. Although the analog video signals may not literally have pixels, each such clock cycle which occurs during a horizontal scan line may be thought of as corresponding to a pixel. Thus, each horizontal scan line includes a row of pixels.

Digital displays, such as flat panel display (FPD) monitors, have been used for some time in laptop and notebook portable computers, and have become increasingly prevalent in desktop computer systems due to several advantages that FPD monitors offer over CRT displays. For example, in comparison to a CRT having the same display area, an FPD monitor is generally lighter in weight, occupies less space and consumes less power than the CRT counterpart display.

An FPD monitor typically includes liquid crystal sandwiched between two layers of polarized material. The alignment of crystals for an area of the display, such as a pixel, can be controlled by applying an electric field to the area. The electric field for each pixel can be controlled by applying voltage to the area via a transistor switch associated with the pixel. Due to the polarization of the layers, the alignment of the crystals for the area also affects the ability of the area to transmit light. Thus, by providing a backlight for the display and by activating appropriate ones of a matrix of transistor switches, an image can be formed on the display. By providing colored filters and additional transistor switches for each pixel, such that a red, green and blue display element is provided for each pixel, color images can be displayed by the FPD.

Because individual display elements of an FPD monitor must be appropriately controlled to form an image, the character of signals required to drive FPD monitors differ markedly from those required to drive CRT displays. More particularly, FPD monitors are generally driven by digital signals in accordance with an appropriate digital protocol, whereas, the RGB, HSYNC and VSYNC video signals formed by the video adapter card are in accordance with an appropriate analog format, as explained above. This has typically required different adapter cards for CRT and FPD monitors.

To drive an FPD monitor using a computer system which is preconfigured for driving a CRT, the analog RGB, HSYNC and VSYNC video signals must be transformed into appropriate digital signals. In addition, it may be desired to perform digital processing on the analog video signals prior to providing such digitally-processed signals to a display monitor. For example, the digitally-processed signals may be provided to a digital display, such as an FPD, or may be converted back into analog signals prior to provision to an analog display, such as a CRT. In either case, the analog video signals must be digitally sampled. The sampling frequency and phase, however, must be precisely synchronized with the analog video signals. Otherwise, the display image can be degraded on the whole, can include areas that are blurred, or can be misaligned to the display area of the display monitor. The synchronization task is further complicated in that application programs often alter the parameters of an analog video signal from those parameters specified by one of the standardized formats (e.g., SVGA).

Therefore, what is needed is are improved techniques for converting analog video signals into digital samples for driving a display monitor. More particularly, what is needed are improved techniques for synchronizing a digital sampling frequency and phase with that of an analog video signal; for horizontal and vertical orienting a display image on a display monitor; and for communication from a host computer system to a display controller. It is to these ends that the present invention is directed.

SUMMARY OF THE INVENTION

The invention is a method and apparatus for control of a display monitor which provides improved techniques for receiving and converting analog video signals formed by a host computer system into digital samples suitable for provision to the display monitor. More particularly, the invention provides improved techniques for synchronizing a digital sampling frequency to the analog video signals; for synchronizing a digital sampling phase to the analog video signals; for horizontally and vertically orienting a display image on the display monitor; and for communication from a host computer system to a controller of the display monitor.

In accordance with an aspect of the invention, a method and apparatus are provided in which digital data is communicated from a computer system to a display device. An analog video signal is received from a computer system, the analog video signal including a predetermined data pattern. The analog video signal is sampled to detect the predetermined data pattern. The digital data is then recovered from the detected predetermined data pattern. The predetermined data pattern may occur a predetermined time interval after a horizontal sync pulse which is associated with the analog video signal. The predetermined data pattern may occur outside of a blanking interval for the analog video signal. The display device may respond to the predetermined data pattern by commencing a set-up process. The set-up process may include adjusting a sampling rate for sampling the analog video signal; adjusting a sampling phase for sampling the analog video signal; or adjusting an orientation of a display image for the display device. Adjusting an orientation of the display image may comprise adjusting a sampling start time for the analog video signal relative to a horizontal or vertical sync pulse.

The predetermined data pattern may be representative of a parameter of the analog video signal. The parameter may be representative of a resolution of the analog video signal. The analog video signal may be formed in accordance with a clock signal, where the parameter is representative of a frequency of the clock signal. The predetermined data pattern may be representative of a beginning of a horizontal blanking interval relative to a horizontal sync pulse for the analog video signal. The predetermined data pattern may be utilized for adjusting a horizontal orientation of a display image for the display device. The predetermined data pattern may be representative of a beginning of a vertical blanking interval relative to a vertical sync pulse for the analog video signal. The predetermined data pattern may be utilized for adjusting a vertical orientation of a display image for the display device.

The present invention provides an improvement in that information, including information relevant to sampling of analog video signals for conversion of those signals into a format suitable for display by a display device, may be provided to the display device by a source of the analog video signals.

DETAILED DESCRIPTION OF A PREFERRED EMBODIMENT

Figure 1:
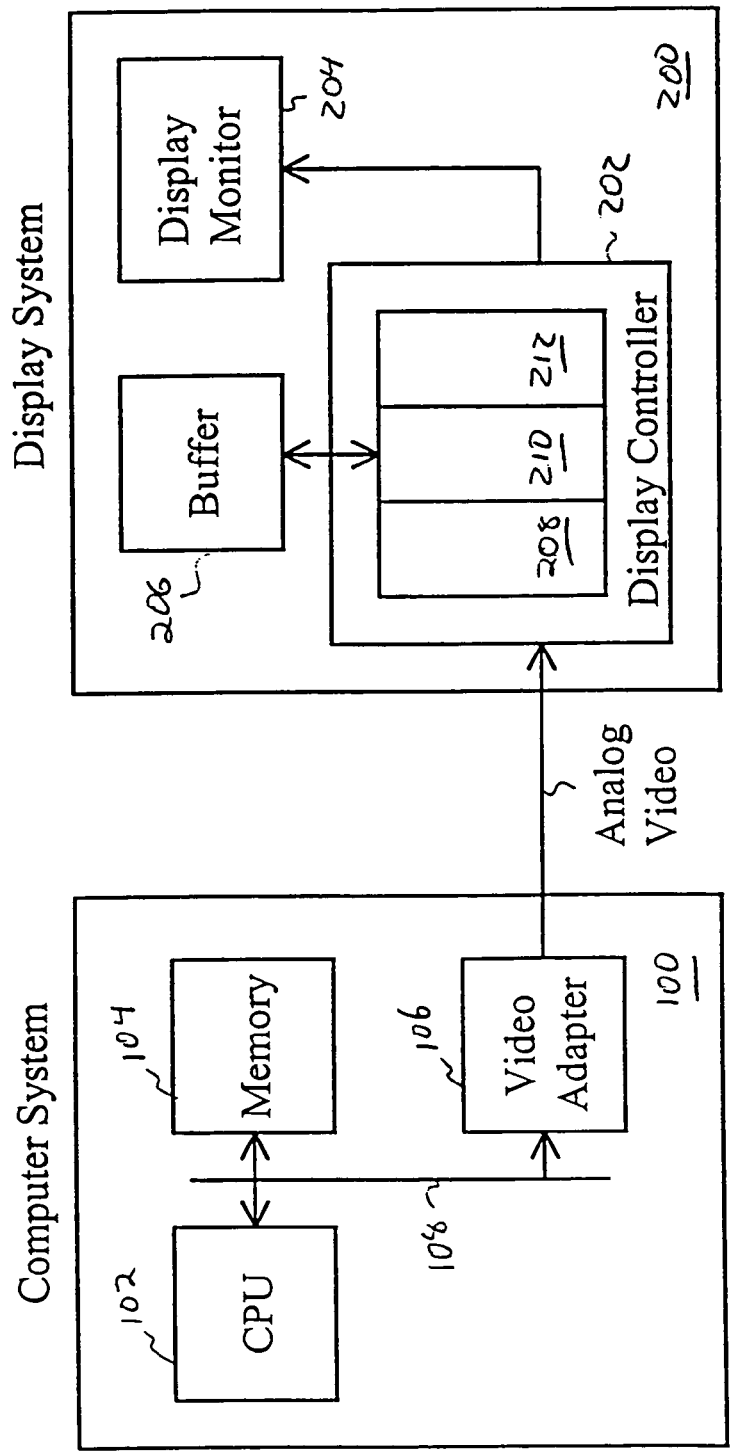
FIG. 1 illustrates a block diagram of a host computer system and a display system in accordance with the present invention.

FIG. 1 illustrates a block diagram of a host computer system 100 driving a display system 200 in accordance with the present invention. The host computer system 200 may include a central processing unit (CPU) 102, a memory 104 and a video adapter 106, all of which are interconnected by a system bus 108. Data representative of an image to be displayed is typically generated by an application program stored in the memory 104 and executed by the CPU 102. The image data may be provided to the video adapter 106 via the system bus 108. The video adapter 106 typically forms analog video signals which are appropriate for driving a cathode ray tube (CRT) display monitor (a CRT display is not shown, but would normally be coupled to the video adapter 106). It will be apparent that the computer system 100 is conventional and that the particular configuration of the computer system 100 illustrated in FIG. 1 is exemplary.

As shown in FIG. 1, the video adapter 106 may be coupled to a display system 200, rather than to a CRT display. The display system 200 includes a display controller 202, a display monitor 204 and may also include a frame buffer 206. The display controller 202 receives the analog video signals from the computer system 100 and converts them into digital samples prior to provision to the display monitor 204. The analog video signals are formed by the computer system 100 synchronously with a clock signal PCLK1 (e.g., a pixel clock). The clock signal PCLK1 may be formed by the CPU 102 or the video adapter 106 of the computer system 100.

Figure 2:
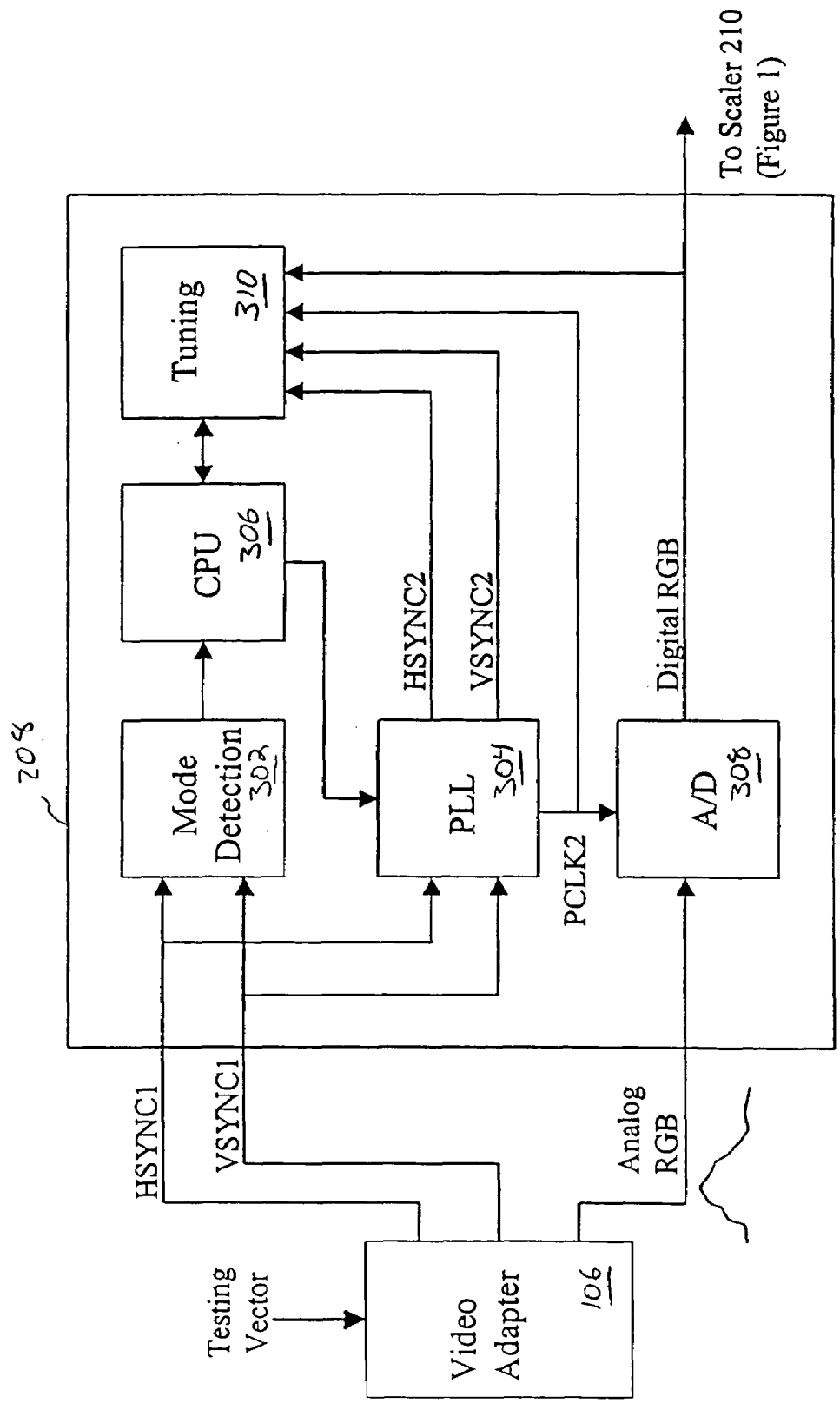
FIG. 2 illustrates a more detailed block diagram of a receiver of the display controller of FIG. 1.

A signal receiver section 208 included in the display controller 202 receives the analog video signals and samples them according to a sampling clock signal PCLK2 generated by a phase-locked loop 304 (FIG. 2). Thus, the receiver section 208 converts the analog video signals into digital samples. The sampling clock signal PCLK2 is derived, in part, from the analog video signals and is further refined and adjusted in response to a set-up technique in accordance with the present invention.

The digital samples may be provided to a scaling section 210 of the display controller 202 and temporarily stored in the buffer 206. The scaling section 210 may modify the samples to compensate for differences in spatial and color resolution between the analog video signals and the requirements of the display monitor 204. For example, the scaling section 210 may interpolate image information between samples or may combine samples, as appropriate.

The samples may then be retrieved from the buffer 206 and provided to the display monitor 204 by an output section 212 of the display controller 202 at a rate appropriate for the display monitor 204. Preferably, the buffer 206 is implemented as dual-port memory so that read and write operations may be performed simultaneously.

The output section 212 provides video signals to the display monitor 204 according to a format appropriate to the display monitor 204. For example, assuming the display monitor 204 is configured to receive digital video signals, the output section 212 provides appropriate digital signals to the display monitor 204. However, assuming that the display monitor 204 is configured to receive analog video signals, the output section 204 converts the digital samples into an analog format appropriate for the display monitor 204. It will be apparent that additional processing of the samples may be performed by the display controller 202. For example, the display controller 202 may perform dithering, which is a technique for representing additional display colors.

FIG. 2 illustrates a more detailed block diagram of the receiver section 208 of FIG. 1. For clarity of illustration, the video adapter 106 of FIG. 1 is also illustrated in FIG. 2. Because the video adapter 106 is configured to drive a CRT display, as previously described, the video adapter 106 may form analog video signals, including an horizontal sync signal HSYNC1, a vertical sync signal VSYNC1 and red (R), green (G) and blue (B) component signals.

A mode detector 302 and a phase-locked loop (PLL) 304 in the receiver section 208 are coupled to receive the HSYNC1 and VSYNC1 signals from the video adapter 106. The mode detector 302 detects a mode (e.g., spatial resolution) of the video adapter 106 based upon the HSYNC1 and VSYNC1 signals. This may include detecting the relative frequencies, as well as the polarities, of the HSYNC1 and VSYNC1 signals. This mode information may be provided by the mode detector 302 to a processor (CPU) 306 of the receiver 208.

The PLL 304 recovers the clock signal PCLK1 based upon the HSYNC1 and VSYNC1 signals and based upon input (e.g., mode information) from the CPU 306. Thus, the PLL 304 forms a recovered clock signal PCLK2 which is utilized for sampling the analog RGB signals. Note that the clock signal PCLK1 is typically not provided among the analog video signals, and is, therefore, not directly available to the receiver section 208. In addition, the PLL 304 may form a recovered horizontal sync signal HSYNC2 and a recovered vertical sync signal VSYNC2 based upon the signals HSYNC1 and VSYNC1. Thus, the HSYNC1 and VSYNC1 signals are preferably available to the receiver 208.

The RGB signals provided by the video adapter 106 are coupled to an analog-to-digital (A/D) converter 308 included in the receiver 208. The A/D converter 308 samples each of the RGB signals according to the sampling clock signal PCLK2. For sampling each of the three RGB signals, the A/D converter 308 may include three channels. Alternately, the A/D converter 308 may comprise three single-channel A/D converters. The A/D converter 308 forms digital RGB samples which may be provided to the scaler 210 (FIG. 1). The digital samples formed by the A/D converter 308 are preferably 8-bit samples, thus, providing 256 discrete sample values, although another number of bits may be selected for the samples.

The recovered signals PCLK2, HSYNC2 and VSYNC2 are provided to a tuning circuit 310 along with the digital RGB samples. The tuning circuit 310, together with the CPU 306, communicate with the PLL 304 so as to control generation of the sampling clock signal PCLK2. As explained in more detail herein, information provided to the PLL 304 via the tuner 310 may control the PLL 304 to better synchronize the sampling clock signal PCLK2 to the frequency and phase of the clock signal PCLK1. This results in an improved image displayed by the display monitor 204 (FIG. 1). Accordingly, the sampling clock signal PCLK2 is better coordinated to the analog video signals provided by the video adapter 106.

For adjusting the frequency of the sampling clock signal PCLK2, a set-up technique involves preconditioning the computer system 100 (FIG. 1) to provide analog video signals to the display controller 202 (FIG. 1) which include a calibration pattern. The calibration pattern may include at least two calibration features in one or more of the RGB signals. The calibration features may be spaced by a predetermined time interval.

Figure 3:
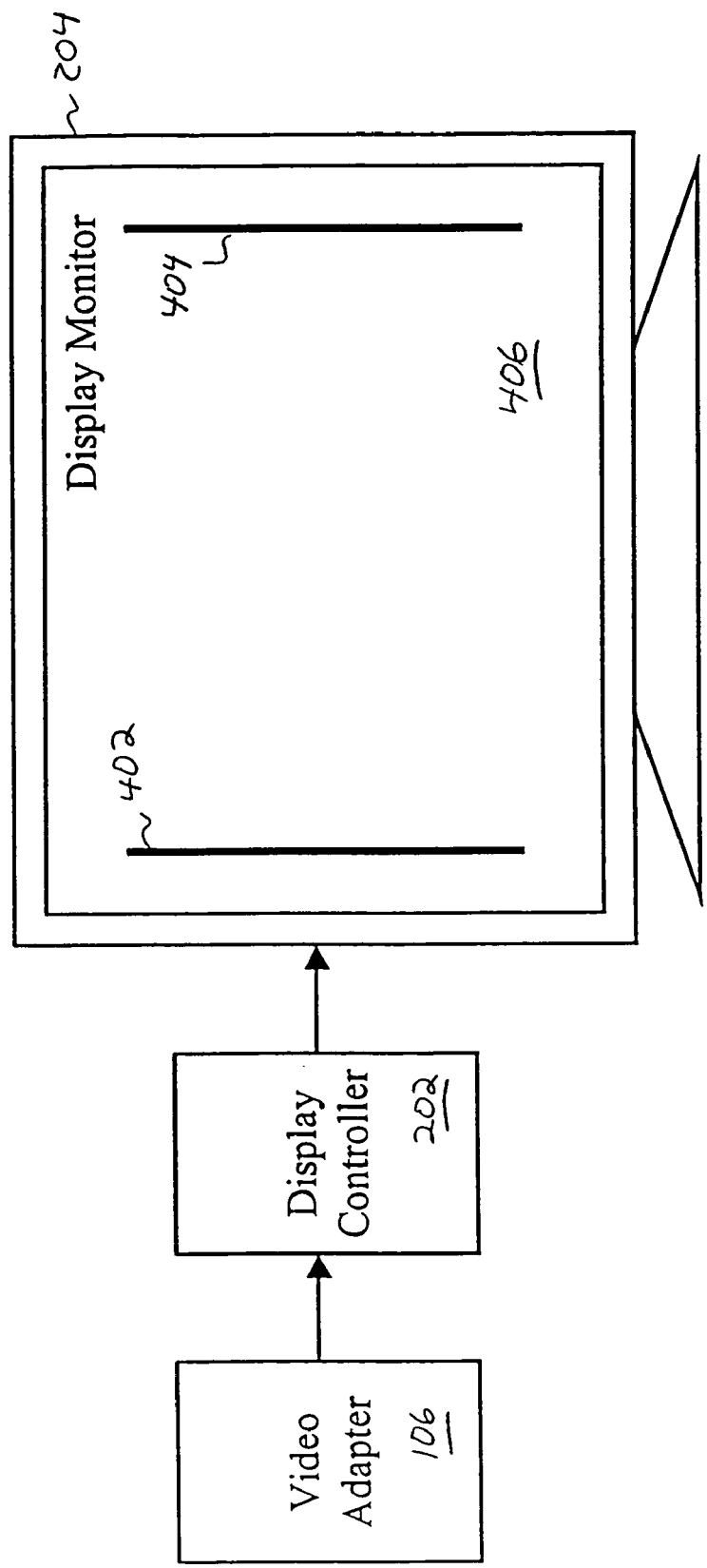
FIG. 3 illustrates a display image including calibration features for adjusting a sampling clock frequency for sampling an analog video signal.

Preconditioning of the computer system 100 involves programming the computer system 100 to display a specific graphic image which is representative of the calibration pattern. As shown in FIG. 3, the calibration features may appear on a display area of the display monitor 204 as vertical lines 402, 404. The calibration features may be distinguished from background 406 by contrast, such as by selecting a lighter shade for the background 406 and a darker shade for the calibration features. Alternately, a darker shade may be selected for the calibration features and lighter shade selected for the background 406.

Though the calibration features (e.g., vertical lines 402, 404) are displayed by the display monitor 204 in FIG. 3, information relevant for adjusting the frequency of the sampling clock PCLK2 is obtained by the receiver 208 (FIGS. 1-2) of the display controller 202 from one or more of the analog video signals. Accordingly, it is not necessary that the calibration features actually appear on the display monitor 204. Rather, the display controller 202 may be conditioned to prevent them from appearing on the display monitor 204. Similarly, the calibration features need only be present in one of the RGB signals to be detected by the receiver 208, though the features may be present in two or three of the RGB signals.

Figure 4:
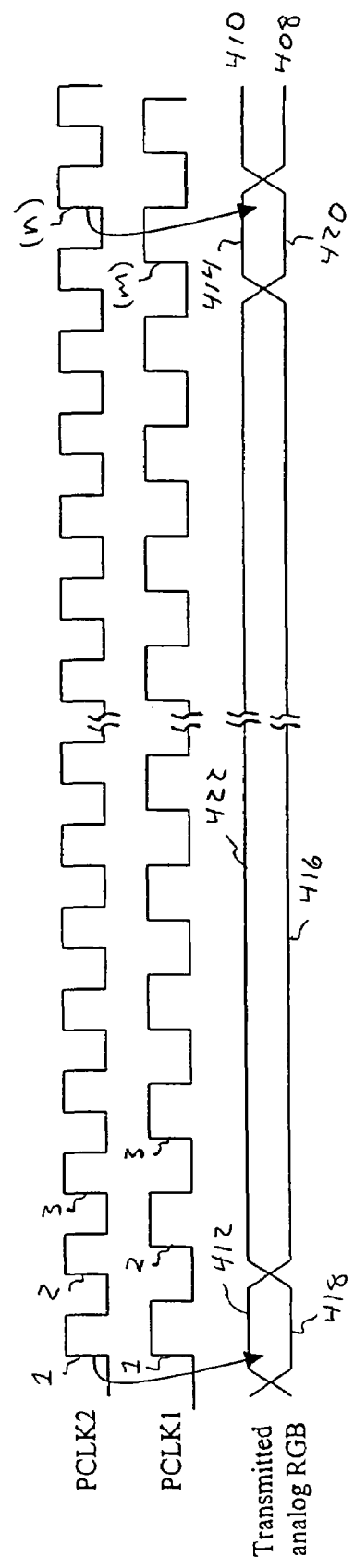
FIG. 4 illustrates a timing diagram for adjusting the sampling clock frequency.

The distance between the two calibration features (e.g., lines 402, 404) in the calibration pattern corresponds to a predetermined time interval related to a predetermined by a number of cycles of the clock signal PCLK1 which occur between the calibration features. This is shown in FIG. 4 where the clock signal PCLK1 is illustrated along with waveforms 408 and 410. The waveform 408 represents the vertical lines 402 and 404 by spaced voltage pulses 412 and 414, respectively, which are higher than a predetermined voltage level 416 representative of the background level (e.g., the lines 402, 404 of FIG. 3 are lighter than the background 406 of FIG. 3). Conversely, the waveform 410 represents the vertical lines 402 and 404 by spaced voltage troughs 418 and 420, respectively, which are lower than a voltage level 422 representative of the background level (e.g., the background 406 of FIG. 3 is lighter than the lines 402, 404 of FIG. 3). Though both waveforms 408, 410 are shown in FIG. 4, only one of the waveforms 408, 410 need be present in the RGB signals for detection of the features (e.g., the vertical lines 402, 404 of FIG. 3).

The receiver 208 (FIGS. 1-2) of the display controller 202 (FIG. 1) detects the calibration features by sampling an appropriate one or more the analog video signals 408, 410 in accordance with the sampling clock signal PCLK2. The clock signal PCLK2 is also shown in FIG. 4. Sampling may occur, for example, upon leading edges of the clock signal PCLK2. Alternately, the trailing edges of the clock signal PCLK2 may be utilized for sampling. A number of cycles (n) of the sampling clock PCLK2 which occur between the vertical lines 402, 404 (FIG. 3) is measured (e.g., counted) by the tuning circuit 310 (FIG. 2). In addition, a predetermined number (m) of cycles of the clock signal PCLK1 occurs between the calibration features. The predetermined number (m) is related to the predetermined time interval between the features and is utilized for preconditioning the computer system 100 to form the analog video signals having the features. The measured number (n) may then be compared to the predetermined number (m). In response to the comparison, the frequency of the sampling clock signal PCLK2 may be adjusted by the CPU 306 controlling the PLL 304 to match the frequency of the clock signal PCLK1 so as to compensate for differences in frequency between the clock signals PCLK1 and PCLK2.

The frequency of the sampling clock signal PCLK2 may be increased or decreased by an amount which is calculated based upon the measured number (n), the predetermined number (m) and upon a frequency for the clock signal PCLK2. For example, assuming that the number (n) is 700 and the number (m) is 665, then the frequency of the sampling clock PCLK2 may be reduced to a level which is 665/700=0.95, or 95 percent, of its present frequency. Alternately, the frequency may be adjusted by an amount equal to a difference between the number (n) and the number (m). The reduced frequency may then be utilized as a sampling frequency of the PCLK2 signal for sampling the analog video signals from the adapter 106. Further, the sampling frequency may be arrived at iteratively. For example, assuming the measured number (n) is higher than the predetermined number (m), than the frequency of the sampling clock signal PCLK2 may be reduced by a predetermined amount (e.g., 1 Hz) or by a calculated amount (e.g., a percentage, as explained above). Then, a new number of cycles may be measured and compared to the predetermined number (m). Accordingly, the final frequency may be reached iteratively, after multiple rounds of adjustment and comparison.

Figure 5:
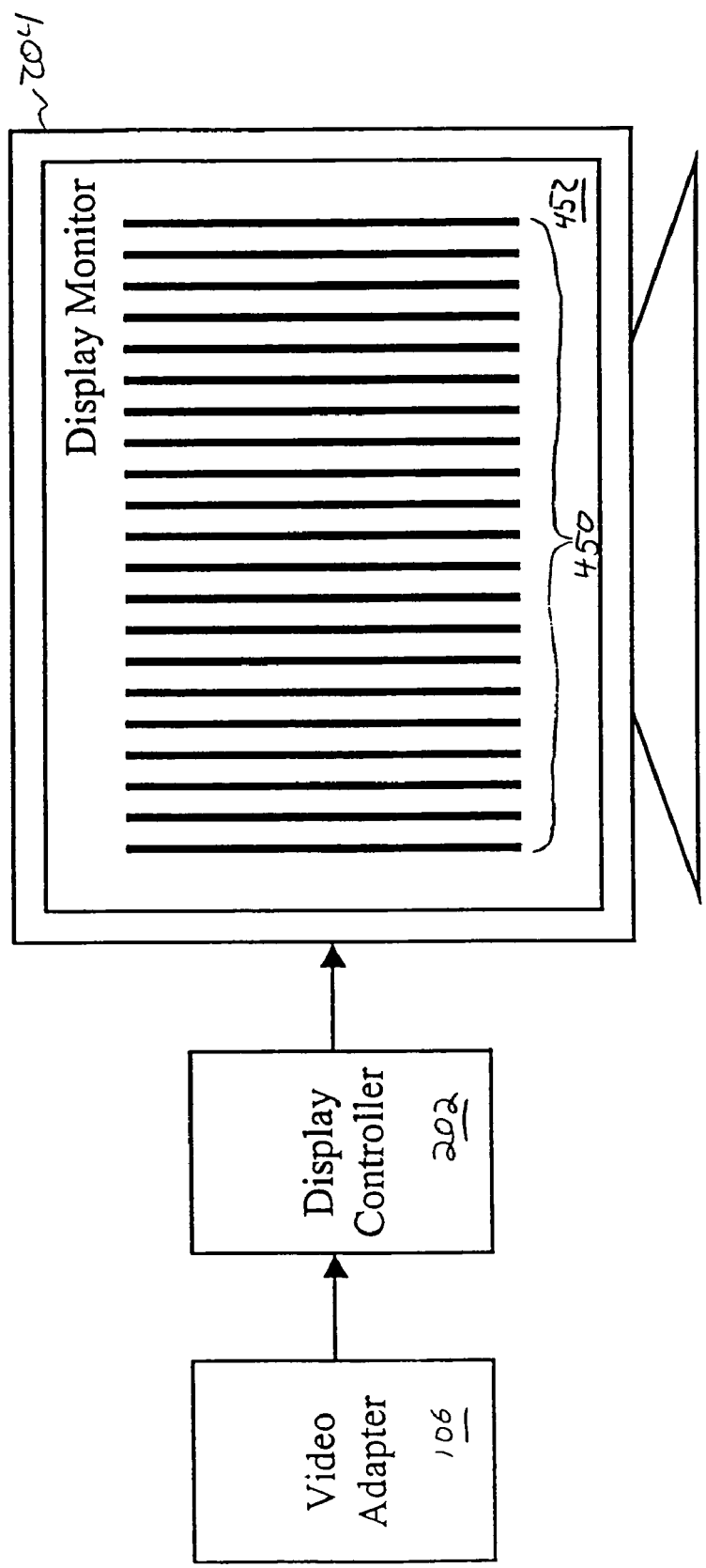
FIG. 5 illustrates a display image including calibration features for adjusting the phase of the sampling clock.

For adjusting the phase of the sampling clock signal PCLK2, a set-up technique involves preconditioning the computer system 100 (FIG. 1) to provide analog video signals to the display controller 202 (FIG. 1) which include a calibration pattern having one or more calibration features. In the preferred embodiment, however, a plurality of calibration features are provided of minimum size, consistent with the resolution of the analog video signals, and spaced by uniform time intervals. These calibration features are present in one or more of the RGB signals. The intervals between calibration features preferably correspond to an integer multiple of cycles of the clock signal PCLK1. As shown in FIG. 5, the calibration pattern may be represented on the display monitor 204 by vertical lines 450. The vertical lines 450 may be distinguished from background 452 by contrast.

Though the calibration features (e.g., the vertical lines 450) are shown in FIG. 5 displayed by the display monitor 204, information relevant for adjusting the phase of the sampling clock PCLK2 may be obtained by the receiver 208 (FIGS. 1-2) of the display controller 202 from one or more of the analog video signals. Accordingly, it is not necessary that these features actually appear on the display monitor 204. Rather, the display controller 202 may be conditioned to prevent these calibration features from appearing on the display 204.

Figure 6:
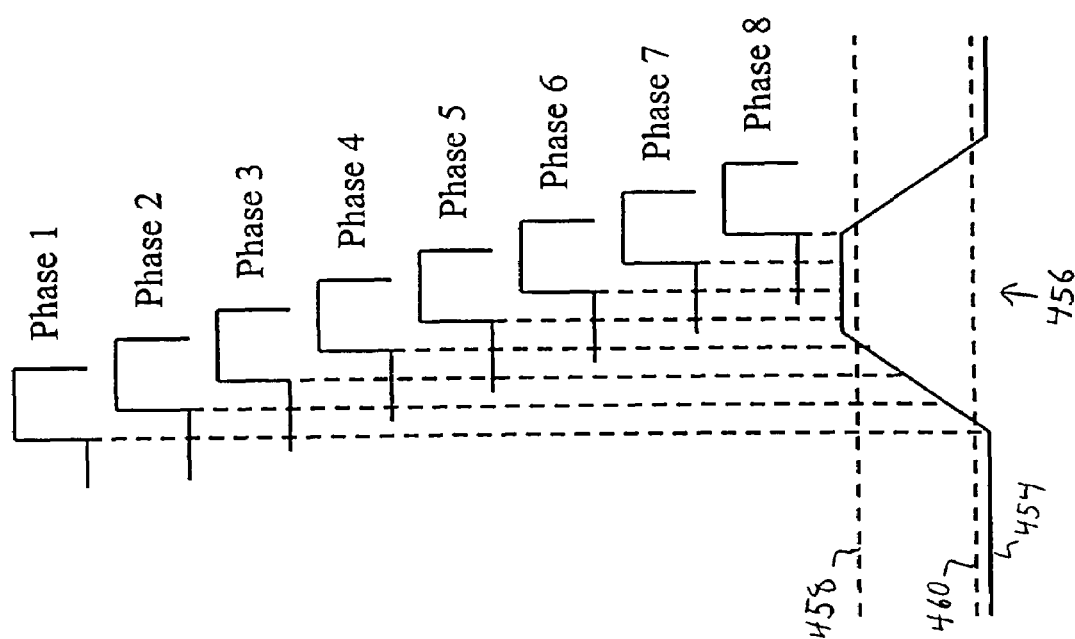
FIG. 6 illustrates a timing diagram for adjusting the phase of the sampling clock signal.

The receiver section 208 of the display controller 202 detects the calibration features by sampling an appropriate one or more of the analog RGB video signals. The sampling is performed in accordance with each of a plurality of phases of the sampling clock signal PCLK2. Preferably, though not necessarily, the phases are spaced apart in phase by uniform phase intervals. Thus, the display controller 202 is capable of adjusting the phase of the sampling clock signal PCLK2. FIG. 6 shows a plurality of phases (Phases 1-8) of the clock signal PCLK2 along with a waveform 454 which is being sampled. The waveform 454 is representative of the vertical lines 450 of FIG. 5. Thus, the waveform 454 includes a voltage pulse 456 which is higher than a voltage level representative of a surrounding background level. Though eight phases are shown in FIG. 6, it will be apparent that more or fewer phases may be utilized (e.g., 32 or 60).

Upon a leading edge of the clock signal PCLK2 for each of the plurality of phases (e.g., Phases 1-8) a sample is taken of the waveform 454, as shown in FIG. 6 by the vertical dotted lines which intersect the waveform 454. Note that the samples need not be taken with respect to the same one of the calibration features (e.g., the vertical lines 450 of FIG. 5). Rather, the samples can be of different ones of the calibration features. This is because generation of the analog video signal which forms each of the plurality of calibration features is synchronized in phase with the clock signal PCLK1. Thus, the pulse 456 of FIG. 6 may be representative of one or several of the vertical lines 450 of FIG. 5.

Whether a phase of the clock signal PCLK2 appropriately detects the feature (represented by the pulse 456) may be determined by comparing the corresponding sample to a threshold level 458. More particularly, assuming that a phase results in sampling the waveform 454 below the level 458, then this indicates that background or an intermediate transition level is detected rather than the calibration feature. This is shown in FIG. 6 by Phases 1-4. Assuming that a phase results in sampling the waveform 454 above the level 458, then this indicates that the phase results in sampling in accurate detection of the calibration feature. This is shown in FIG. 6 by Phases 3-6.

Alternately, the calibration feature may be represented by a trough in the waveform 454 and the background may be represented by a level higher that that of the calibration feature. In which case, a lower threshold level 460 may also be provided, as shown in FIG. 6. The lower threshold may be utilized for detecting calibration features which are present in one or more of the analog video signals as a voltage trough surrounded by a higher level representative of background. In which case, samples taken for each of the phases of the clock signal PCLK2 may be compared to the lower threshold 460 or to a range of values between the thresholds 458, 460. Samples below the threshold 460 may indicate accurate detection of the feature. Samples within the range bounded by the thresholds 458, 460 represent a transition, while samples above the upper threshold 458 may indicate background. Thus, it will be apparent that a single value or a range of values can be used for comparison. Preferably, the thresholds 458, 460 are selected such that an appropriate phase is selected for the sampling clock PCLK2 despite ringing or noise which may occur in the waveform 454.

As a result of comparison of the samples to one or both of the thresholds 458, 460 one or more of the phases may result in detection of the calibration feature (e.g., Phases 5-8, as shown in FIG. 6), whereas, one or more of the phases may not (e.g., Phases 1-4 in FIG. 6). Preferably, a phase is selected that is between two other phases which also result in detection of the feature. In the example shown in FIG. 6, the Phases 6 and 7 are each between two other phases which also detect the feature 456. More particularly, Phase 6 is between Phase 5 and Phase 7, while Phase 7 is between Phase 6 and Phase 8, all of which result in detection of the feature. Thus, either Phase 6 or Phase 7 may be selected for the clock signal PCLK2. The selected phase may then be used for detecting the analog video signals received from the adapter 106.

To generalize phase selection, assuming that one or two phases for the clock signal PCLK2 result in accurate detection of the calibration feature, then any of such phases may be selected for the clock signal PCLK2. However, assuming that an odd number of phases of three or more result in accurate detection of the feature, then the selected phase is preferably generally centrally located among those phases (e.g., if Phases 3-7 result in detection of the feature, then Phase 5 is selected). Alternately, assuming that an even number of phases of four or more result in accurate detection of the feature, then the selected phase is preferably one of the two adjacent and centrally located of those phases (e.g., if Phases 2-7 result in detection of the feature, then Phase 4 or Phase 5 is selected). Accordingly, the selected phase desirably results in sampling near a center of the feature, which reduces the possibility of detection errors should the phase of the sampling clock PCLK2 or the phase of the analog video signal vary somewhat over time. As a result, the selected phase for the sampling clock signal PCLK2 closely approximates the phase of the clock signal PCLK1.

Figure 7:
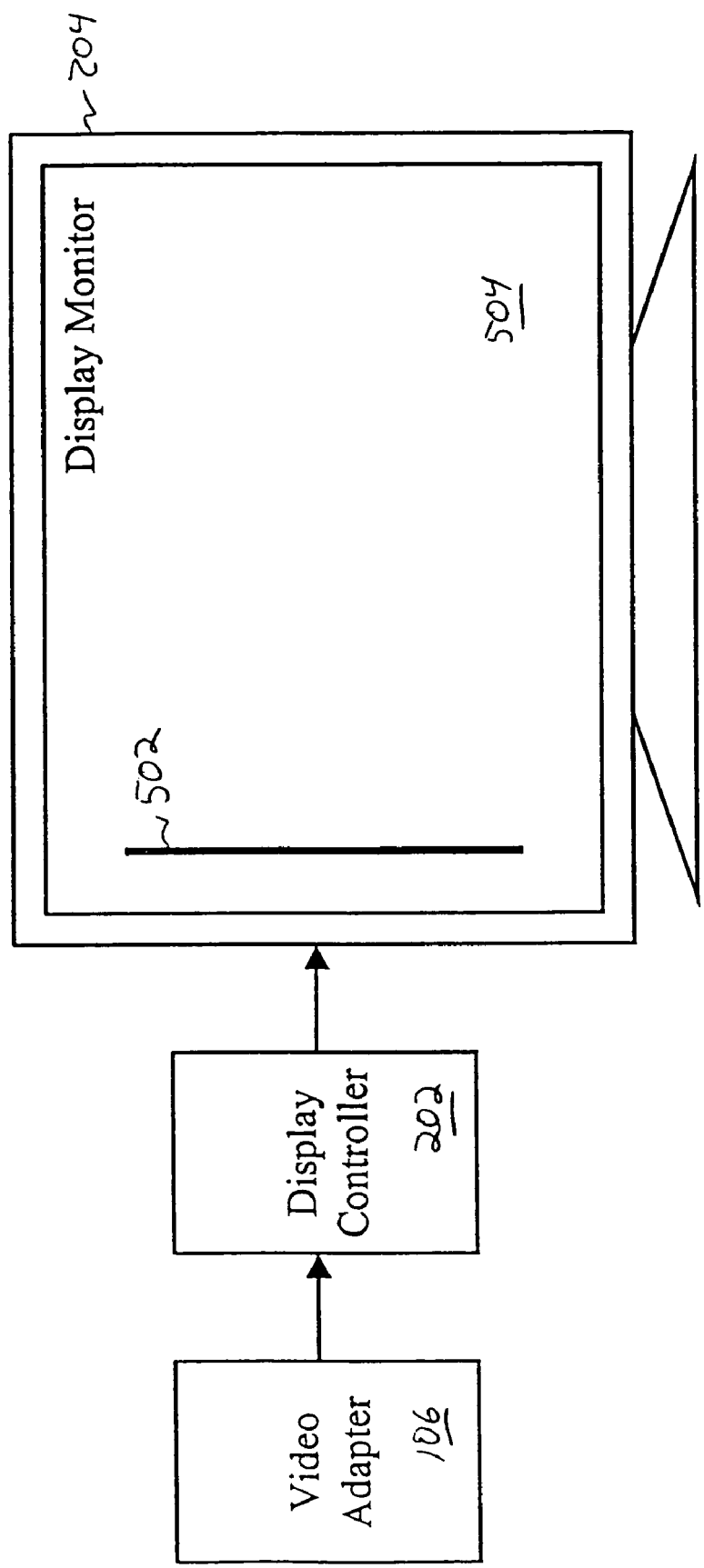
FIG. 7 illustrates a display image including a calibration feature for horizontally orienting a display image for a display monitor in accordance with the present invention.

For orienting a display image horizontally to a display area of the display monitor 204 (FIG. 1), the set-up process involves preconditioning the computer system 100 (FIG. 1) to provide analog video signals to the display controller 202 (FIG. 1) which include a calibration pattern having at least one calibration feature. This calibration feature is present in one or more of the RGB signals. For example, as shown in FIG. 7, the calibration feature may be represented on the display monitor 204 as a single vertical line 502, similar to the vertical line 402 (FIG. 3) utilized for adjusting the frequency of the sampling clock PCLK2. The line 502 may be distinguished from background 504 by contrast.

Though the calibration feature is shown in FIG. 7 displayed by the display monitor 204, information relevant for orienting the display image is obtained by the receiver 208 (FIGS. 1-2) of the display controller 202 from one or more of the analog video signals. Accordingly, it is not necessary that this feature (e.g., the line 502) actually appear on the display monitor 204. Rather, the display controller 202 may be conditioned to prevent this calibration feature from appearing on the display 204.

Figure 8:
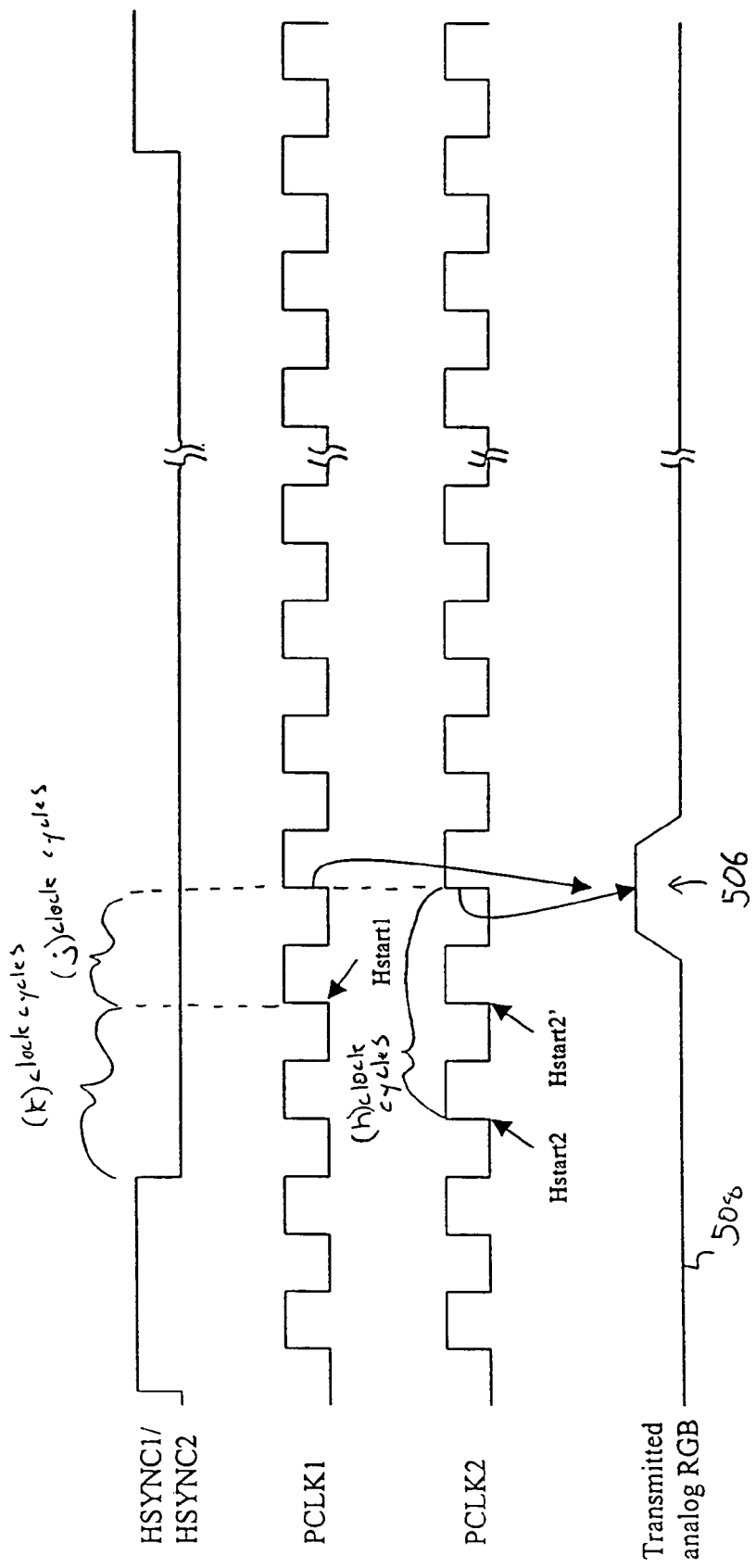
FIG. 8 illustrates a timing diagram for horizontally orienting the display image.

For orienting the display image, the vertical line 502 of FIG. 7 is represented in FIG. 8 by a pulse 506 in waveform 508. The waveform 508 is representative of one or more of the analog video signals. The pulse 506 has a higher voltage level than a level corresponding to the background 504 (FIG. 7). For the analog video signals, a horizontal blanking interval follows a pulse in the HSYNC1 signal. The end of the blanking interval corresponds to an initial display position in the horizontal direction (designated as Hstart1 in FIG. 8) and occurs a predetermined number (k) of cycles of the clock signal PCLK1 after a pulse in the HSYNC1 signal.

Each cycle of the clock signal PCLK1 may correspond to a certain or minimum horizontal display increment, such as a pixel. Thus, the initial display position after the blanking interval may be a first pixel of a horizontal scan line, while each cycle in the clock signal PCLK1 occurring thereafter (until a next horizontal sync pulse) may correspond to one additional display increment in the scan line. As shown in FIG. 8, the initial display position coincides with a second leading edge in the clock signal PCLK1 after the pulse in the HSYNC1 signal (and is labeled Hstart1). Because the horizontal blanking interval may vary, the number (k) of cycles of the clock signal PCLK1 between the HSYNC1 pulse and the Hstart1 clock cycle, also vary.

Note that because the HSYNC1 signal is provided to the display controller 202, the derived signal, HSYNC2 is expected to be closely synchronized to the HSYNC1 signal. Accordingly, these two signals are shown as one in FIG. 8.

The vertical line 502 of FIG. 7 has a predetermined position relative to the end of the blanking interval (e.g., the initial horizontal display position) which is generally determined by the programming of the computer system 100. Accordingly, a predetermined number (j) of cycles of the clock signal PCLK1 occur between the Hstart1 clock cycle and the pulse 506 of FIG. 8. This is shown in FIG. 8 by the pulse 506 being centered at approximately at leading edge one clock cycle after the Hstart1 clock cycle. Thus, the calibration feature (e.g., the vertical line 502) is present at the second display increment (e.g., the second pixel) of the horizontal scan line. The number (j) of clock cycles between the Hstart1 clock cycle and the pulse 506, however, may also vary. Thus, the feature 502 may be present in a horizontal scan line at a position other than at the second pixel.

For detecting the feature 502, the receiver 208 (FIG. 2) of the display controller 202 may begin sampling an appropriate one or more of the analog video signals after a pulse in the HSYNC2 signal. Accordingly, a start of sampling time (labeled Hstart2 in FIG. 8) for the receiver 208 may occur upon a next leading edge of a cycle of the signal PCLK2 after the pulse in the HSYNC2 signal. A number of cycles (h) of the clock signal PCLK2 which occur between the Hstart2 cycle and detection of the pulse 506 is then measured (e.g., counted). This measured number (h) is then compared to the predetermined number (j) of cycles in the PCLK1 signal between the end of the blanking interval Hstart1 and the pulse 506. Based upon this comparison, the number of cycles (h) in the sampling clock signal PCLK2 between the HSYNC2 pulse and start of sampling (the Hstart2 cycle of PCLK2) is adjusted, if necessary, such that start of sampling coincides with the end of the blanking interval and, thus, coincides with the first pixel of a horizontal scan line (the Hstart1 cycle of PCLK1) (e.g., the number h is made equal to the number j). Accordingly, in the example shown in FIG. 8, start of sampling of the analog video signal is adjusted to occur at a cycle of the sampling clock signal PCLK2 which is labeled Hstart2' in FIG. 8.

To summarize, a display image is oriented horizontally for the display monitor 204 (FIG. 1) by establishing a predetermined horizontal position of a calibration feature relative to an initial display position (e.g., a first pixel of a horizontal line) for the analog video signals. This position is represented as a time interval equal to a number of cycles of the clock signal PCLK1. Then, a position of the same feature relative to a horizontal sync pulse is measured by digital sampling of the analog video signals. This position is represented as a time interval measured as a number of cycles of the sampling clock signal PCLK2. Finally, start of sampling for the display controller 202 (FIG. 1) relative to the horizontal sync pulse is adjusted such that the measured position coincides with the predetermined position. This may be accomplished by adjusting the start of sampling time to coincide with the end of blanking interval. As a result, a left-hand edge of an image displayed by the display monitor 204 is oriented such that the image is aligned to the left-hand edge of the display monitor 204 (assuming that the analog video is scanned from left to right). A right-hand edge of the display image is expected to be aligned with the right-hand edge of the display monitor 204 because the width of the image is appropriately scaled for the display monitor 204 by the scaling section 210 (FIG. 1) of the display controller 202.

Figure 9:
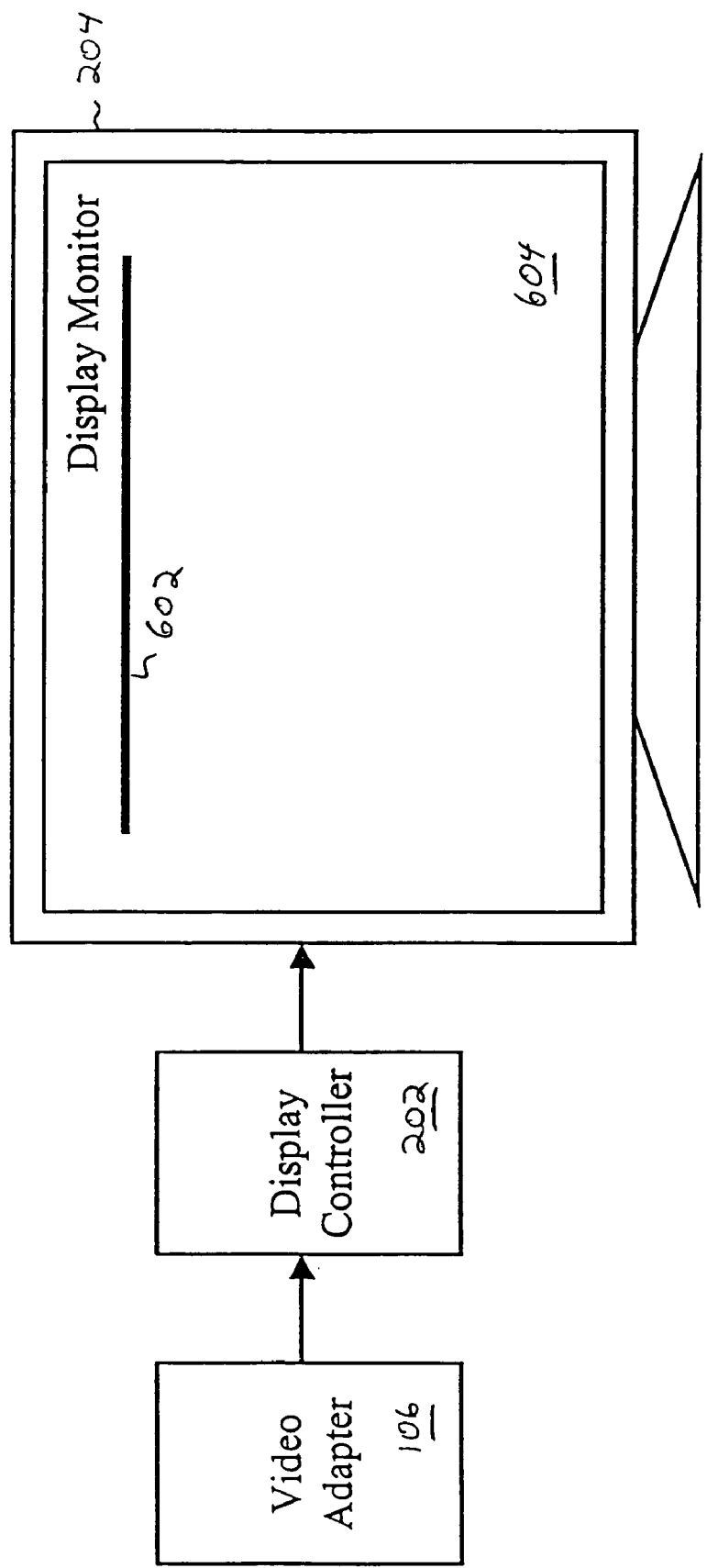
FIG. 9 illustrates a display image including a calibration feature for vertically orienting a display image for a display monitor in accordance with the present invention.

For orienting a display image vertically to a display area of the display monitor 204 (FIG. 1), the set-up process involves preconditioning the computer system 100 (FIG. 1) to provide analog video signals to the display controller 202 (FIG. 1) which include a calibration pattern having at least one calibration feature. This calibration feature is present in one or more of the RGB signals. For example, as shown in FIG. 9, the represented calibration feature may be a single horizontal line 602. The horizontal line 602 may be distinguished from background 604 by contrast.

Though the calibration feature is shown in FIG. 9 displayed by the display monitor 204, information relevant for orienting the display image is obtained by the receiver 208 (FIGS. 1-2) of the display controller 202 from one or more of the analog video signals. Accordingly, it is not necessary that this feature actually appear on the display monitor 204. Rather, the display controller 202 may be conditioned to prevent this calibration feature from appearing on the display 204.

Figure 10:
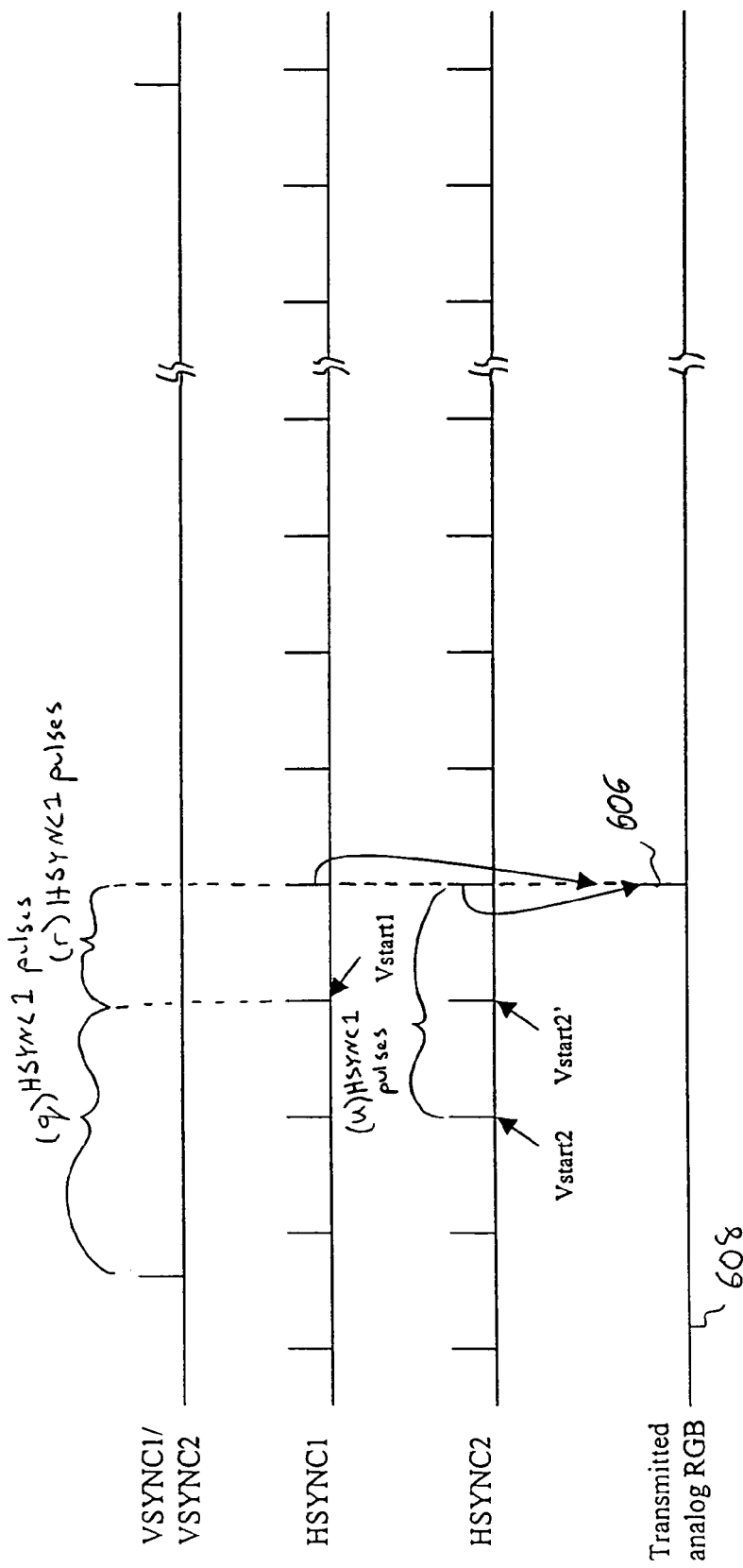
FIG. 10 illustrates a timing diagram for vertically orienting the display image.

FIG. 10 illustrates a timing diagram for vertically orienting a display image for a display monitor in accordance with the present invention. Note that the time scale of FIG. 10 is expanded to relation to that of FIG. 8. More particularly, FIG. 10 illustrates multiple horizontal sync pulses which occur in the signals HSYNC1 and HSYNC2 between vertical sync pulses in the signals VSYNC1 and VSYNC2. Note that because the VSYNC1 signal is provided to the display controller 202, the derived signal, VSYNC2 is expected to be closely synchronized to the VSYNC1 signal. Accordingly, these two signals are shown as one in FIG. 10. Similarly, the HSYNC1 and HSYNC2 signals are also expected to be closely synchronized to each other. However, for clarity of illustration of the set-up process for orienting an image vertically in accordance with the present invention, the HSYNC1 and HSYNC2 signals are shown separately in FIG. 10.

For orienting the display image, the horizontal line 602 of FIG. 9 is represented in FIG. 10 by a pulse 606 in waveform 608. The waveform 608 is representative of one or more of the analog video signals. The pulse 606 has a higher voltage level than a level corresponding to the background 604 (FIG. 9). For the analog video signals, a vertical blanking interval follows a pulse in the VSYNC1 signal. The end of the blanking interval corresponds to an initial display position in the vertical direction (designated as Vstart1 in FIG. 10 and occurs a predetermined number (q) of pulses of the HSYNC1 signal after a pulse in the VSYNC1 signal.

Each pulse of the HSYNC1 signal may correspond to a certain or minimum vertical display increment, such as a pixel. Thus, the initial display position after the blanking interval may be a first horizontal scan line, while each pulse in the HSYNC1 signal occurring thereafter (until a next vertical sync pulse) may correspond to one additional horizontal scan line. As shown in FIG. 10, the initial display position coincides with a third pulse in the HSYNC1 signal after the pulse in the VSYNC1 signal (and is labeled Vstart1). Because the vertical blanking interval may vary, the number of pulses (q) of the HSYNC1 signal between the pulse in the VSYNC1 signal and the Vstart1 pulse, may also vary.

The horizontal line 602 of FIG. 9 has a predetermined position relative to the end of the blanking interval (e.g., the initial vertical display position) which is generally determined by the programming of the computer system 100. Accordingly, a predetermined number (r) of HSYNC1 pulses occur between the Vstart1 clock cycle and the pulse 606 of FIG. 10. This is shown in FIG. 10 by the pulse 606 being located approximately at one pulse in the HSYNC1 signal after the Vstart1 clock cycle. Thus, the calibration feature (e.g., the horizontal line 602) is present at the second vertical display increment (e.g., at the second horizontal line). The number of pulses (r) in the HSYNC1 signal between the Vstart1 clock cycle and the pulse 606, however, may also vary. Thus, the feature 602 may be present at a position other than at the second horizontal line.

For detecting the feature 602, the receiver 208 (FIG. 2) of the display controller 202 may begin sampling an appropriate one or more of the analog video signals after a pulse in the VSYNC2 signal. Accordingly, a start of sampling time (labeled Vstart2 in FIG. 8) for the receiver 208 may begin upon a next pulse in the HSYNC2 signal following a pulse in the VSYNC2 signal. A number of pulses (u) of the HSYNC2 signal which occur between the Vstart2 cycle and detection of the pulse 606 is then measured (e.g., counted). This measured number (u) is then compared to the predetermined number (r) of pulses in the HSYNC1 signal between the end of the blanking interval (the Vstart1 pulse) and the pulse 606. Based upon this comparison, the number of pulses in the HSYNC2 signal between the VSYNC2 pulse and start of sampling (the Vstart2 pulse) is adjusted, if necessary, such that start of sampling coincides with the end of the blanking interval and, thus, coincides with the first horizontal line (the Vstart1 pulse) (e.g., the number u is made equal to the number r). Accordingly, in the example shown in FIG. 10, start of sampling of the analog video signal is adjusted to occur upon a pulse of the HSYNC2 signal which is labeled Vstart2' in FIG. 10.

To summarize, a display image is oriented vertically for the display monitor 204 (FIG. 1) by establishing a predetermined vertical position of a calibration feature relative to an initial display position (e.g., a first horizontal line) for the analog video signals. This position is represented as a time interval equal to a number of pulses in the HSYNC1 signal. Then, a position of the same feature relative to a vertical sync pulse is measured by digital sampling of the analog video signals. This position is represented as a time interval measured as a number of pulses in the HSYNC2 signal. Finally, start of sampling for the display controller 202 (FIG. 1) relative to the vertical sync pulse is adjusted such that the measured position coincides with the predetermined position. This may be accomplished by adjusting the start of sampling time to coincide with the end of the vertical blanking interval. As a result, a top edge of an image displayed by the display monitor 204 is oriented such that the image is aligned to the top edge of the display monitor 204 (assuming that the analog video is scanned from top to bottom). A bottom edge of the display image is expected to be aligned with the bottom edge of the display monitor 204 because the height of the image is appropriately scaled for the display monitor 204 by the scaling section 210 (FIG. 1) of the display controller 202.

Referring again to FIG. 1, so that the display controller 202 is prepared to perform each of the above-described set-up techniques at an appropriate time, the computer system 100 may be preconditioned for notifying the display controller 202 prior to performing one or more of these set-up techniques. In the preferred embodiment, the computer system 100 is preconditioned to provide a predetermined data sequence via one or more of the analog RGB signals by encoding the data onto the analog signal.

Figure 11:
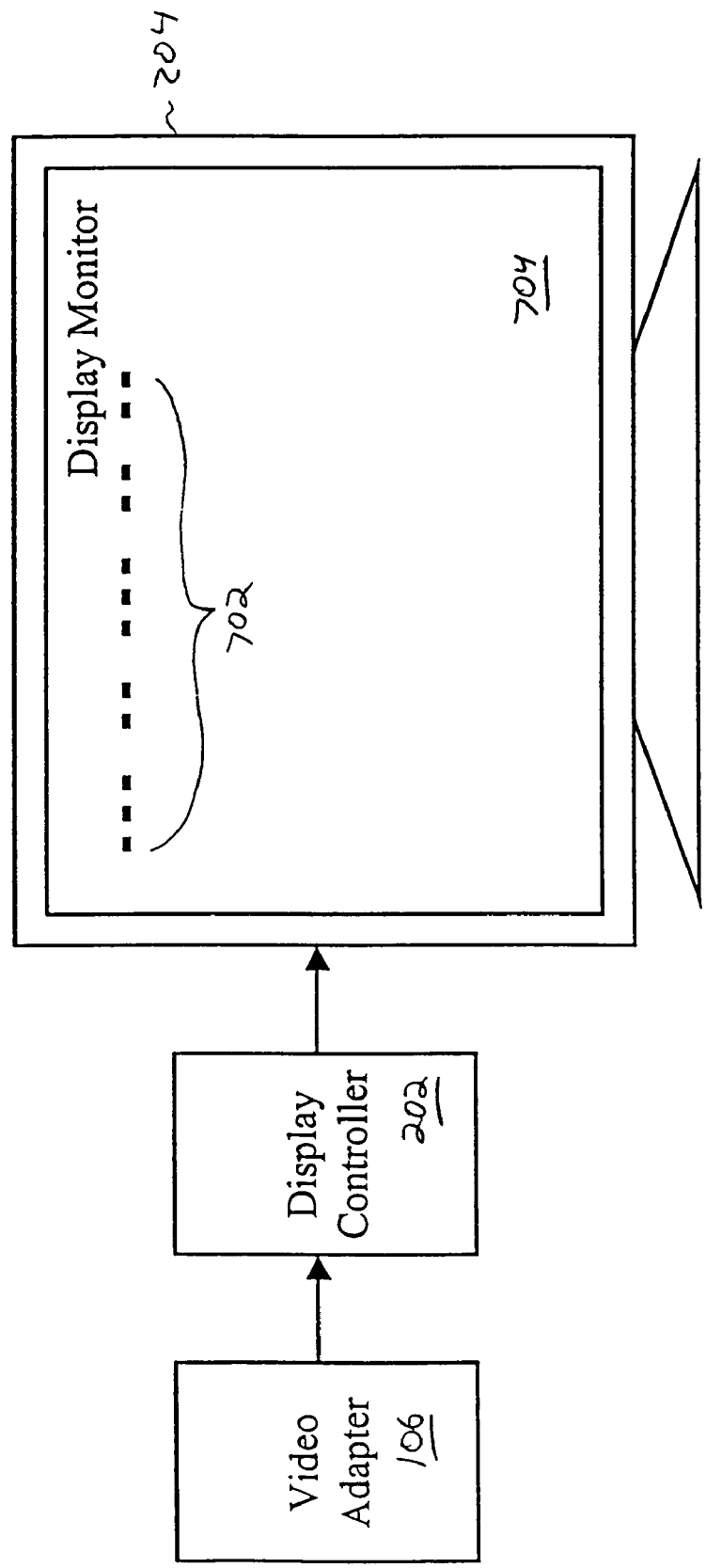
FIG. 11 illustrates a display image including calibration features for communicating digital data from a host computer system to a display controller.

FIG. 11 illustrates a display image including features 702 for communicating digital data from the host computer system 100 to the display controller 202 in accordance with the present invention. As shown in FIG. 11, the features 702 form a unique pattern (i.e., a data sequence) which is distinguished from background 704 by contrast. It will be apparent that the pattern shown in FIG. 11 is exemplary and that one or more different data sequences may be utilized. The display controller 202 samples one or more of the analog signals to detect and to identify the data sequence being sent by the computer system 100.

Though the features 702 are displayed by the display monitor 204 in FIG. 11, the data sequence is obtained by the receiver 208 (FIGS. 1-2) of the display controller 202 from one or more of the analog video signals. Accordingly, it is not necessary that the features 702 actually appear on the display monitor 204. Rather, the display controller 202 may be conditioned to prevent them from appearing on the display monitor 204. Similarly, the features 702 need only be present in one of the RGB signals to be detected by the receiver 208, though the features 702 may be present in two or three of the RGB signals.

For detecting the features 702, the features 702 may be provided beginning at a predetermined time interval after a pulse in the HSYNC2 signal and may be outside of horizontal and vertical blanking intervals.

Once the data sequence is identified, the display controller 202 may respond by performing one or more of the set-up techniques initiated by the particular data sequence. Accordingly, the data sequence serves as a command from the computer system 100 to the display controller 202. A single predetermined data sequence and, thus, a single command, may instruct the display controller to perform all of the set-up techniques in a predetermined order. These set-up techniques may include: sampling frequency adjustment as described herein with references to FIGS. 3-4; sampling phase adjustment, as described herein with reference to FIGS. 5-6; horizontal display orientation, as described herein with reference to FIGS. 7-8; and vertical display orientation, as described herein with reference to FIGS. 9-10. Alternately, several different commands may be provided to the display controller 202 by the computer system 100. For example, a predetermined data sequence and, thus, a command, may correspond uniquely to each of these set-up techniques (e.g., sampling frequency adjustment) or to groupings of selected ones of the set-up techniques (e.g., sampling frequency and phase adjustment).

In accordance with another embodiment of the present invention, predetermined data sequences provided by the computer system 100 (FIG. 1) to the display controller 202 via one or more of the analog video signals may include information regarding the analog video signals formed by the computer system 100. For example, a data sequence may inform the display controller 202 as to various parameters of the analog video signals (e.g., horizontal or vertical resolution) or as to which standardized format the computer system utilizes for forming the analog video signals (e.g., VGA or Super VGA).

As another example, the data sequence may provide information to the display controller 202 representative of the beginning and ending of the horizontal and vertical blanking intervals relative to horizontal and vertical sync pulses, respectively. Thus, the data sequence may include values representative of the duration of the front or back porch for the analog video signals, such as a number (e.g., the number k of FIG. 8) of cycles of the clock signal PCLK1 between a pulse in the HSYNC1 signal and an initial horizontal display position. Further, the data sequences may include a number (e.g., the number q of FIG. 10) of pulses in the HSYNC1 between a pulse in the VSYNC1 signal and an initial vertical display position.

Providing information to the display controller 202 representative of the horizontal blanking period using a data sequence in the analog video signals may be utilized to appropriately orient the display image horizontally. In which case, it may be unnecessary to orient the image by detecting a calibration feature in the manner described with reference to FIGS. 7-8. Similarly, providing information to the display controller 202 representative of the vertical blanking period using a data sequence in the analog video signals may be utilized to appropriately orient the display image vertically. In which case, it may be unnecessary to orient the image by detecting a calibration feature in the manner described with reference to FIGS. 9-10.

As yet another example, the data sequence may provide information to the display controller 202 representative of the frequency of the clock signal PCLK2. In which case, it may be unnecessary to adjust the clock frequency using a calibration patter in the manner described with reference to FIGS. 3 and 4.

From the foregoing it should be apparent that the present invention provides an improvement in that sampling of analog video signals for conversion of those signals into a format suitable for display by a display monitor may be better adapted to a source of the analog video signals.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of communicating digital data from a computer system to a display device comprising:
   receiving and processing an analog video signal from a computer system via receiver means for receiving and processing analog video signals, wherein the receiver means for receiving and processing includes a mode detection circuit, a processing circuit, a tuning circuit, a phase lock loop (PLL), and an analog-to-digital converter;
   sampling the analog video signal to provide digital data;
   performing compensation of the digital data including modifying data via means for scaling to compensate for differences in spatial and color resolution between the analog video signal and requirements of the display device;
   detecting a predetermined data pattern from the digital data, wherein the predetermined data pattern corresponds to a frequency or resolution parameter of the analog signal; and
   in response to detection of the predetermined data pattern, commencing a set-up process for converting a video signal into a display image of improved format for display on the display device, wherein the set-up process includes:
      programming the computer system to precondition the received analog video signal with a calibration pattern having calibration features for enabling calibration, and
      adjusting sampling via feedback that adjusts a sampling rate as a function of a number of cycles (n) of a sampling clock and a predetermined number (m) of a clock signal occurring between the calibration features; and
   wherein the improved format enables more accurate display of original image data.

2. The method according to claim 1, wherein the predetermined data pattern occurs a predetermined time interval after a horizontal sync pulse which is associated with the analog video signal.

3. The method according to claim 1, wherein the predetermined data pattern occurs outside of a blanking interval for the analog video signal.

4. The method according to claim 1, wherein the set-up process includes adjusting a sampling rate for sampling the analog video signal.

5. The method according to claim 4, wherein the set-up process includes adjusting an orientation of a display image for the display device.

6. The method according to claim 1, wherein the set-up process includes adjusting a sampling phase for sampling the analog video signal.

7. The method according to claim 1, wherein the set-up process includes adjusting an orientation of a display image for the display device.

8. The method according to claim 7, wherein said adjusting an orientation of the display image comprises adjusting a sampling start time for the analog video signal relative to a horizontal sync pulse.

9. The method according to claim 7, wherein said adjusting an orientation of the display image comprises adjusting a sampling start time for the analog video signal relative to a vertical sync pulse.

10. The method according to claim 1, wherein the parameter is representative of a resolution of the analog video signal.

11. The method according to claim 10, wherein the set-up process includes adjusting an orientation of a display image for the display device.

12. The method according to claim 1, wherein the analog video signal is formed in accordance with a clock signal, the parameter being representative of a frequency of the clock signal.

13. The method according to claim 1, wherein the predetermined data pattern is representative of a beginning of a horizontal blanking interval relative to a horizontal sync pulse for the analog video signal.

14. The method according to claim 13, wherein the predetermined data pattern is utilized for adjusting a horizontal orientation of a display image for the display device.

15. The method according to claim 1, wherein the predetermined data pattern is representative of a beginning of a vertical blanking interval relative to a vertical sync pulse for the analog video signal.

16. The method according to claim 15, wherein the predetermined data pattern is utilized for adjusting a vertical orientation of a display image for the display device.

17. An apparatus for communicating digital data from a computer system to a display device comprising:
receiver means for receiving and processing analog video signals, wherein the receiver means for receiving and processing includes a mode detection circuit a processing circuit, a tuning circuit, a phase lock loop (PLL), and an analog-to-digital converter;
a sampling component that samples the analog video signal to detect a predetermined data pattern of a frequency or resolution parameter of the analog signal;
a processing component that recovers digital data from the detected predetermined data pattern;
a compensation component that performs compensation of the digital data including modifying data via means for scaling to compensate for differences in spatial and color resolution between the analog video signal and requirements of the display device;
feedback elements coupled to adjust a sampling rate as a function of a number of cycles (n) of a sampling clock and a predetermined number (m) of a clock signal occurring between the calibration features;
a preconditioning component that preconditions the received analog video signal with a calibration pattern having calibration features for enabling calibration, and
a display controlling component that commences a set-up process, in response to detection of the predetermined data pattern, for converting a video signal into a display image of improved format for display on the display device, wherein the set-up process includes adjusting sampling via a feedback component, and wherein the improved format enables more accurate display of original image data.

18. The apparatus according to claim 17, wherein the predetermined data pattern occurs a predetermined time interval after a horizontal sync pulse which is associated with the analog video signal.

19. The apparatus according to claim 17, wherein the predetermined data pattern occurs outside of a blanking interval for the analog video signals.

20. The apparatus according to claim 17, wherein the set-up process includes adjusting a sampling rate for sampling the analog video signal.

21. The apparatus according to claim 20, wherein the set-up process includes adjusting an orientation of a display image for the display device.

22. The apparatus according to claim 17, wherein the set-up process includes adjusting a sampling phase for sampling the analog video signal.

23. The apparatus according to claim 17, wherein the set-up process includes adjusting an orientation of a display image for the display device.

24. The apparatus according to claim 23, wherein said adjusting an orientation of the display image comprises adjusting a sampling start time for the analog video signal relative to a horizontal sync pulse.

25. The apparatus according to claim 23, wherein said adjusting an orientation of the display image comprises adjusting a sampling start time for the analog video signal relative to a vertical sync pulse.

26. The apparatus according to claim 17, wherein the parameter is representative of a resolution of the analog video signal.

27. The apparatus according to claim 26, wherein the set-up process includes adjusting an orientation of a display image for the display device.

28. The apparatus according to claim 17, wherein the analog video signal is formed in accordance with a clock signal, the parameter being representative of a frequency of the clock signal.

29. The apparatus according to claim 17, wherein the predetermined data pattern is representative of a beginning of a horizontal blanking interval relative to a horizontal sync pulse for the analog video signal.

30. The apparatus according to claim 29, wherein the predetermined data pattern is utilized for adjusting a horizontal orientation of a display image for the display device.

31. The apparatus according to claim 17, wherein the predetermined data pattern is representative of a beginning of a vertical blanking interval relative to a vertical sync pulse for the analog video signal.

32. The apparatus according to claim 31, wherein the predetermined data pattern is utilized for adjusting a vertical orientation of a display image for the display device.

* * * * *